Sept. 5, 1933. E. C. ROSENOW Re. 18,934
HUMIDIFYING DEVICE
Original Filed Oct. 1, 1928 2 Sheets-Sheet 1
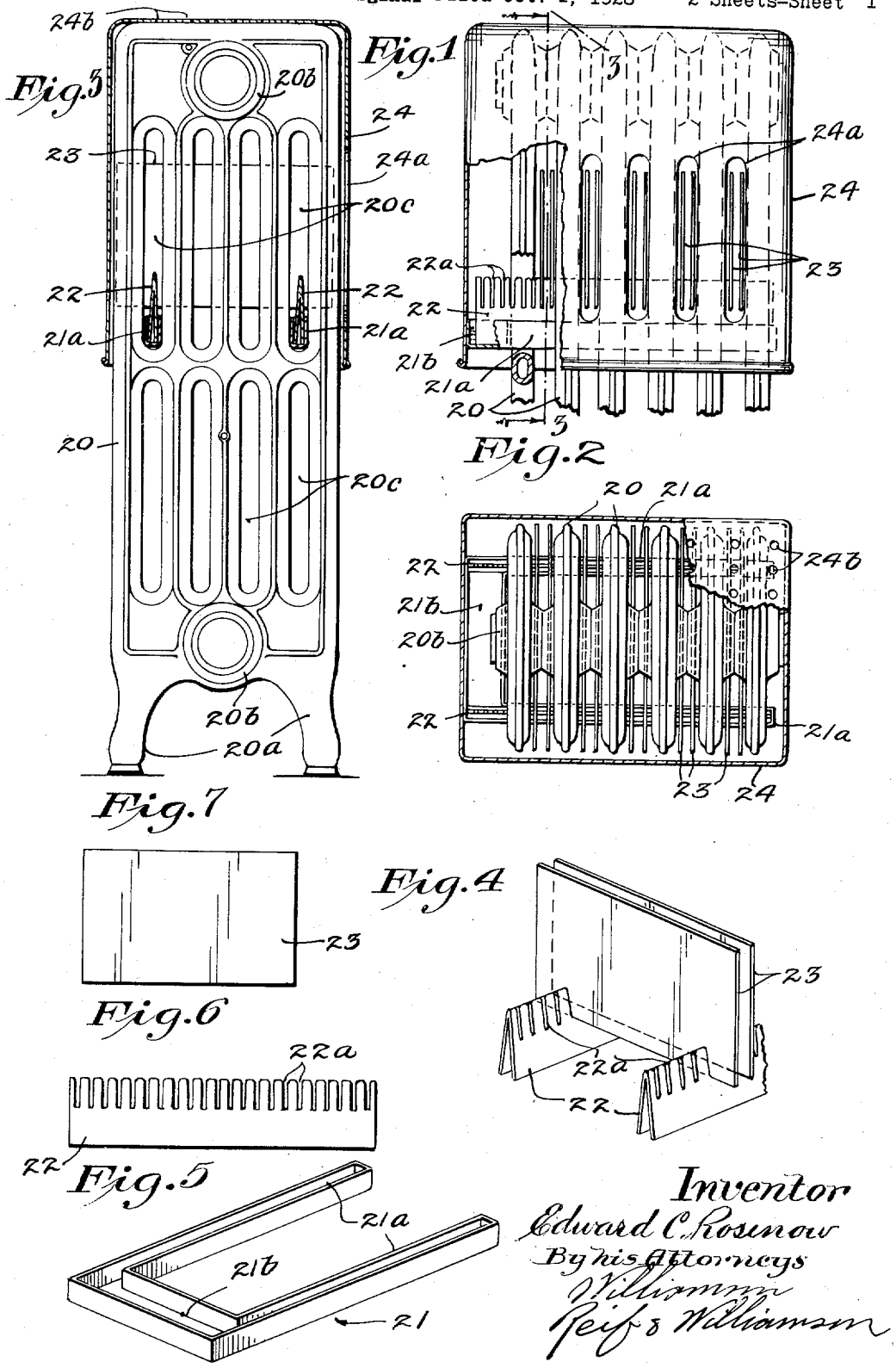

Sept. 5, 1933. E. C. ROSENOW Re. 18,934

HUMIDIFYING DEVICE

Original Filed Oct. 1, 1928 2 Sheets-Sheet 2

Inventor
Edward C. Rosenow
By his Attorneys
Williamson Reifer & Williamson

Reissued Sept. 5, 1933

Re. 18,934

UNITED STATES PATENT OFFICE 18,934

HUMIDIFYING DEVICE

Edward C. Rosenow, Rochester, Minn.

Original No. 1,817,648, dated August 4, 1931, Serial No. 309,449, October 1, 1928. Application for reissue September 10, 1932. Serial No. 632,625

11 Claims. (Cl. 299—23)

This invention relates to an air humidifying, cleansing and sterilizing device, and while the invention may have various applications, it is particularly designed for use in connection with a radiator such as the heating radiators commonly used in dwellings and other buildings. The importance of having such a device is being recognized more and more by architects and heating engineers and such devices are now being installed in large numbers.

In such a device using absorbent sheets it is desirable to have a humidifying unit which can be easily made and assembled and which can be easily transported and installed, whether in the original structure or as a replacement.

It is an object of this invention, therefore, to provide a simple, neat and efficient humidifying device adapted to be conveniently supported upon or in a radiator.

It is another object of the invention to provide a humidifying device comprising a simple and efficient absorbing unit which can be easily made and assembled and easily transported and installed.

It is more specifically an object of the invention to provide a humidifying device comprising a receptacle adapted to contain liquid, and having spaced, narrow, longitudinally extending portions with a connecting portion at one end adapted to be disposed upon or in a radiator, together with an absorbent unit comprising absorbent sheets disposed in said spaced portions and having transverse sheets engaged and supported thereby and extending transversely therebetween.

It is also an object of the invention to provide a humidifying unit comprising spaced absorbent sheets having their lower portions submerged in liquid and having a plurality of absorbent sheets engaging the same, along a line and extending therebetween above the liquid.

These and other objects and advantages of the invention will be fully set forth in the following description made in connection with the accompanying drawings, in which like reference characters refer to similar parts throughout the several views and in which:

Fig. 1 is a view in side elevation of the device applied to the radiator, some parts being broken away and others shown in vertical section;

Fig. 2 is a top plan view of the device, some parts being broken away and other parts shown in horizontal section;

Fig. 3 is a vertical section taken substantially on line 3—3 of Fig. 1, as indicated by the arrows, the entire radiator being shown;

Fig. 4 is a perspective view showing the arrangement of the absorbent sheets used;

Fig. 5 is a perspective view of the liquid receptacle used;

Fig. 6 is a view in side elevation of an absorbent sheet used;

Fig. 7 is a view in side elevation of another absorbent sheet used;

Figure 9:
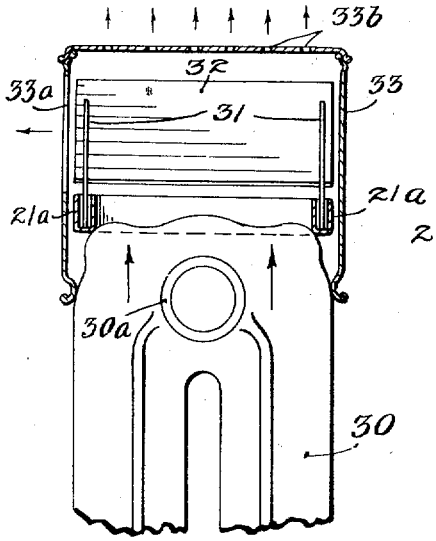
Fig. 9 is a vertical section taken on line 9—9 of Fig. 8, as indicated by the arrows.

Referring to the drawings, particularly Figs. 1 to 7, a radiator of rather late type is shown comprising the sections 20 having the supporting leg portions 20*a* and the bosses 20*b* at the top and bottom, which are arranged in contact for connecting the sections, said sections being hollow. The sections, as well understood, carry the heating medium and in the type disclosed said sections are provided with a plurality of vertically extending narrow slots 20*c*, the radiator illustrated having upper and lower sets of said slots.

Figure 15:
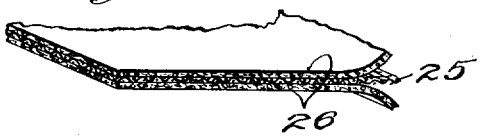
Fig. 15 is a sectional perspective view showing the structure of the absorbent sheets used.

In accordance with the present invention, a receptacle 21 is provided adapted to contain a humidifying liquid, such as water, having the desired sterilizing substances in solution therein. The receptacle 21 comprises spaced, longitudinally extending, narrow portions 21*a* and an end connecting portion 21*b*. In practice, receptacle 21 will be provided with a supplying and regulating means for the liquid (not shown). Absorbent sheets are disposed in the portions 21*a* and while these sheets might be made in various forms, in the embodiment of the invention illustrated they are shown as sheets 22 folded along their central or intermediate lines into V-shaped formation, the same being supported in the portions 21*a* by having their free edges received therein. Said sheets 22 are provided with slots 22*a* in their folded portions and other absorbent sheets 23 extend between the sheets 22, being disposed in the slots 22*a* and extending over receptacle 21. The end portions of the sheets 23 preferably extend beyond the remote sides of portions 21*a*, as shown in Figs. 2 and 3. The receptacle 21 is conveniently supported in the radiator by having the portions 21*a* extending through certain of the slots 20*c*, as shown in Fig. 3, said portions resting in the bottom of said slots. With the receptacle so disposed it is seen that the sheets 23 extend between sections 20 of the radiator, as shown in Figs. 1 and 2. It will be noted that the sheets 23 are engaged by the sheets 22 only along a line or lines disposed on said sheets. A cover 24 is provided which encloses the top and sides of the radiator to a point below receptacle 21, said cover having spaced slots 24*a* therein preferably aligned with the spaces between the radiator sections 20. The cover 24 also preferably has openings in its top, such as the holes 24*b*. While the absorbent sheets 22 and 23 may be variously made, one convenient form thereof is shown in Fig. 15 and comprises a layer of metal screen 25, such as commonly used in window screens, on either side of which is secured by some suitable adhesive, a layer of blotting paper 26.

In operation, water, preferably containing a non-volatile disinfectant, such as potassium permanganate, will be supplied to the receptacle 21 and maintained at a certain level therein. The sheets 22 will have their lower edge portions disposed in this liquid and will become saturated with the liquid due to capillary attraction. The sheets 23 will also absorb the liquid and become well filled with the same. The air passing upward through the radiator transversely therethrough will engage the sheets 22 and 23 and absorb cosiderable moisture therefrom, said moisture evaporating from said sheets. This evaporation will be hastened by the heat of the radiator. A circulation of humidified air, therefore, will be caused upward from the radiator through the openings 24*b* and laterally therefrom through the openings 24*a*. With the cover 24 removed the sheets 23 can be readily removed and the receptacle 21 can be removed after sheets 23 are removed, or by lifting said sheets and sheets 22 from the receptacle. In assembling, the receptacle 21 and sheets 22 will be placed in the radiator and sheets 23 will then be inserted in place between the sections of the radiator. It is obvious that the absorbent sheets can be easily and quickly replaced. The humidifier is thus conveniently supported in the radiator and disposed in an efficient position. The same is at the same time not exposed unduly to view so that a neat structure is produced.

Figure 8:
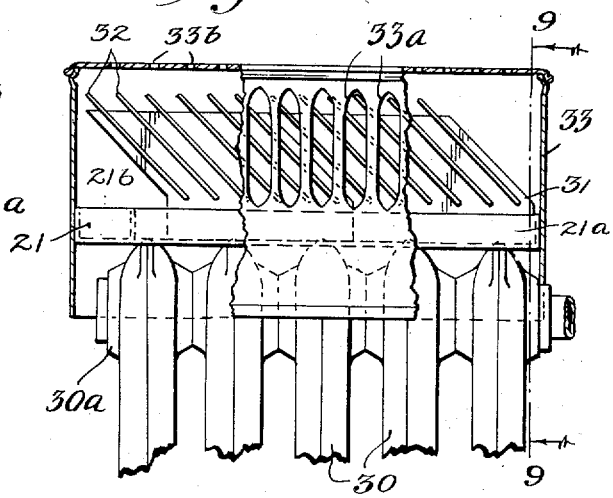
Fig. 8 is a view similar to Fig. 1 showing a modified form of the invention.
Figure 10:
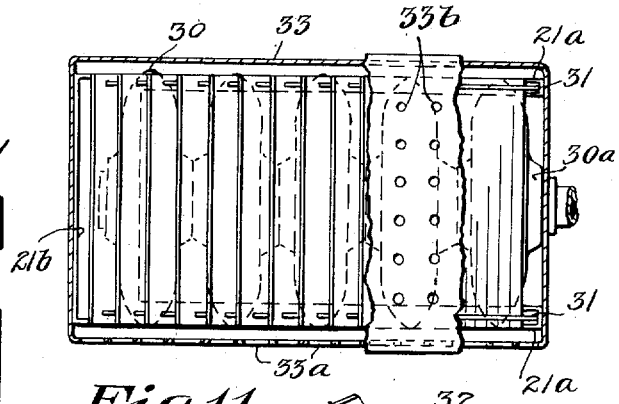
Fig. 10 is a plan view of the device shown in Fig. 8, some parts being broken away and others shown in horizontal section.
Figure 13:
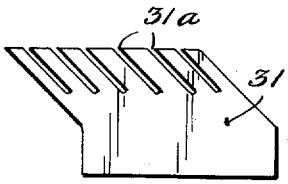
Fig. 13 is a view in side elevation of one absorbent sheet used.
Figure 14:
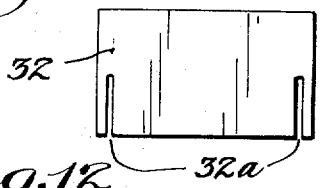
Fig. 14 is a view in side elevation of another absorbent sheet used.
Figure 12:
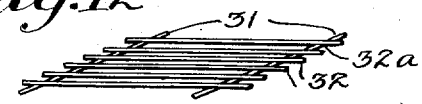
Fig. 12 is a plan view of the unit in collapsed position.
Figure 11:
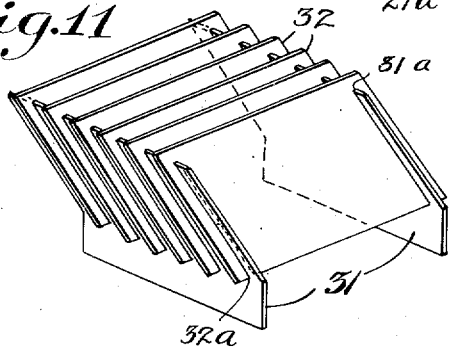
Fig. 11 is a perspective view of an absorbent unit used.

In Figs. 8 to 12 a different form of radiator is shown which is of an older type and comprises sections 30 having bosses 30*a* which are arranged in contact when the sections are assembled as shown in Fig. 8. The receptacle 21 already described is placed on top of the sections 30, portions 21*a* extending downwardly slightly below the top of the radiator at the curved upper sides of the radiator sections, as shown in Fig. 9. While the absorbent sheets 22 and 23 could be used, another form of unit is shown disposed in receptacle 21, which unit comprises absorbent sheets 31 extending longitudinally of the portions 21*a* and upwardly therein. Slots 31*a* are formed in sheets 31 and while these slots might be variously disposed, in the embodiment of the invention illustrated they are shown as extending diagonally downward from the top edges of sheets 31. Sheets 31 are shown as having diagonally extending end portions parallel to the slots 31*a*. Other absorbent sheets 32 are provided, illustrated as of rectangular shape and as having slots 32*a* extending thereinto from one side. Sheets 32 are disposed so as to extend between sheets 31, the slots 32*a* embracing sheets 31 below slots 31*a* and the latter embracing the top portions of sheets 32. A humidifying unit such as shown in Fig. 11 is thus produced and this unit may be as long as desired or have as many of the sheets 32 therein as is desired. It will be seen that such a unit can be collapsed into comparatively flat form by skewing the same as shown in Fig. 12 to bring all of the sheets into substantially the same plane. The unit 31 is placed in and above the receptacle 21 with the lower portions of sheets 31 disposed in the portions 21*a*, sheets 32 thus extending transversely between and above portions 21*a*. A cover 33 is provided which has side and top walls and will be conveniently supported upon the radiator as shown. Said cover has a plurality of slots 33*a* in one side wall and a plurality of openings such as the holes 33*b* in its top. The sheets 31 and 32 preferably will be of a construction shown in Fig. 15.

In operation the liquid used will be supplied to receptacle 21 by suitable means and maintained at a certain level therein. This liquid will be absorbed by the sheets 31 so that they will become saturated and the liquid will also be absorbed from the sheets 31 by the sheets 32 so that the latter will also be well filled with the liquid. The heat from the radiator evaporates the liquid from the sheets 31 and 32, the air moving upward through and about the radiator coming in contact with said sheets, particularly the sheets 32 which are disposed across the upward path of said air. This air passes outwardly and upwardly through the openings 33*a* and 33*b* so that a circulation of humidified air is produced. When the cover 33 is removed the units 31 can readily be removed from the receptacle 21 and new ones placed therein when desired.

From the above description it is seen that I have provided a simple and efficient form of humidifier particularly adapted for use with a heating radiator. The device has been amply tested in actual practice and has been very successful. An effective humidification of the air is produced. The device is easily and inexpensively made and the same is easily and quickly installed and can easily be maintained.

It will, of course, be understood that various changes may be made in the form, details, arrangement and proportions of the parts, without departing from the scope of the invention, which, generally stated, consists in a device capable of carrying out the objects above set forth, in the novel parts and combinations of parts disclosed and defined in the appended claims.

I claim:

1. A humidifier having in combination, a receptacle adapted to contain liquid and comprising spaced, longitudinally extending, narrow portions, absorbent sheets respectively disposed in said portions and extending lengthwise therein, having their lower portions disposed in said liquid, and a plurality of absorbent sheets engaging and supported by said first mentioned sheets and extending transversely therebetween above said receptacle.

2. A humidifier having in combination, a receptacle adapted to contain liquid and comprising spaced, longitudinally extending, narrow portions, absorbent sheets respectively disposed in said portions and extending lengthwise therein, having their lower portions disposed in said liquid, said sheets having spaced slots formed therein, and a plurality of absorbent sheets extending between said first mentioned sheets and disposed in said slots thereof.

3. A humidifier having in combination, a receptacle adapted to contain liquid and comprising spaced, longitudinally extending portions, absorbent sheets respectively disposed in said portions and extending lengthwise therein, said absorbent sheets having their lower portions disposed in said liquid, and a plurality of upstanding absorbent sheets engaging said first mentioned sheets and extending transversely therebetween.

4. A humidifier having in combination a receptacle adapted to contain liquid and comprising spaced, longitudinally extending portions, upstanding absorbent sheets respectively disposed in said portions and extending lengthwise therein, said absorbent sheets having their lower portions disposed in said liquid, and a plurality of upstanding absorbent sheets engaging and supported by said first mentioned sheets and extending transversely therebetween.

5. A humidifier comprising in combination an elongated receptacle adapted to extend lengthwise within a heating radiator and to contain water, an absorbent member arranged in said receptacle longitudinally thereof and projecting therefrom for taking moisture by capillary attraction from the receptacle, and a plurality of absorbent sheets supported on edge across the receptacle and said first named absorbent member and having close fitted engagement with said first named absorbent member at spaced intervals therealong effective for taking moisture by capillary attraction from said first named absorbent member.

6. A humidifier comprising in combination receptacle means adapted to contain water, an absorbent sheet in the form of a strip of material doubled upon itself longitudinally for providing spaced lower edge portions upon which it stands in upright position in the receptacle means, said sheet having a series of notches along its upper edge, and a series of absorbent sheets supported on edge in said notches transversely of the first named sheet and adapted to take moisture by capillary attraction from said first named sheet.

7. A humidifier comprising in combination receptacle means having two spaced leg portions each adapted to contain water, two absorbent members in said leg portions respectively extending longitudinally thereof in spaced relation to each other and projecting from the receptacle means for taking moisture by capillary attraction therefrom, and a plurality of absorbent sheets supported on edge transversely across the receptacle means and connected with said first named absorbent members at spaced intervals therealong for taking moisture by capillary attraction from said first named absorbent members.

8. In a humidifier, the combination of receptacle means adapted to contain water and comprising two portions in spaced relation to each other with a passageway for a stream of air between the receptacle portions, two absorbent sheets arranged in said receptacle portions respectively longitudinally of said portions for taking moisture by capillary attraction from the receptacle portions, and a plurality of absorbent sheets supported on edge transversely between said first named absorbent sheets and connected therewith by notched engagement at spaced intervals therealong for taking moisture by capillary attraction from said first named absorbent sheets.

9. In a humidifier, the combination of receptacle means adapted to contain water and comprising two narrow portions in spaced relation to each other with a passageway for a stream of air between said receptacle portions, two absorbent members supported on edge in said receptacle portions respectively for taking moisture by capillary attraction from the receptacle portions, said members at their lower edge portions having wide bases which hold the members from any substantial tipping sidewise in said receptacle portions, and a plurality of absorbent sheets supported on edge across said first named absorbent members at spaced intervals therealong and removably connected therewith by a close fitting engagement for taking moisture by capillary attraction from said first named absorbent members.

10. A humidifier comprising in combination receptacle means having two spaced leg portions each adapted to contain water, two absorbent sheets supported on edge in said leg portions respectively longitudinally thereof in spaced relation to each other for taking moisture by capillary attraction from the receptacle portions, and a plurality of absorbent sheets supported on edge transversely of the receptacle portions and connected with said first named absorbent sheets at spaced intervals therealong by interengaging notches in the upper edges of said first named sheets and the lower edges of said second named sheets whereby moisture is taken by capillary attraction from said first named sheets.

11. A humidifier comprising in combination receptacle means having two spaced leg portions each adapted to contain water, two absorbent sheets resting on edge in said receptacle portions respectively in spaced relation to each other for taking moisture by capillary attraction from the receptacle portions, and a plurality of transversely extending obliquely disposed absorbent sheets connected with said first named absorbent sheets at spaced intervals therealong for taking moisture by capillary attraction from said first named sheets.

EDWARD C. ROSENOW.